Patented Feb. 10, 1931

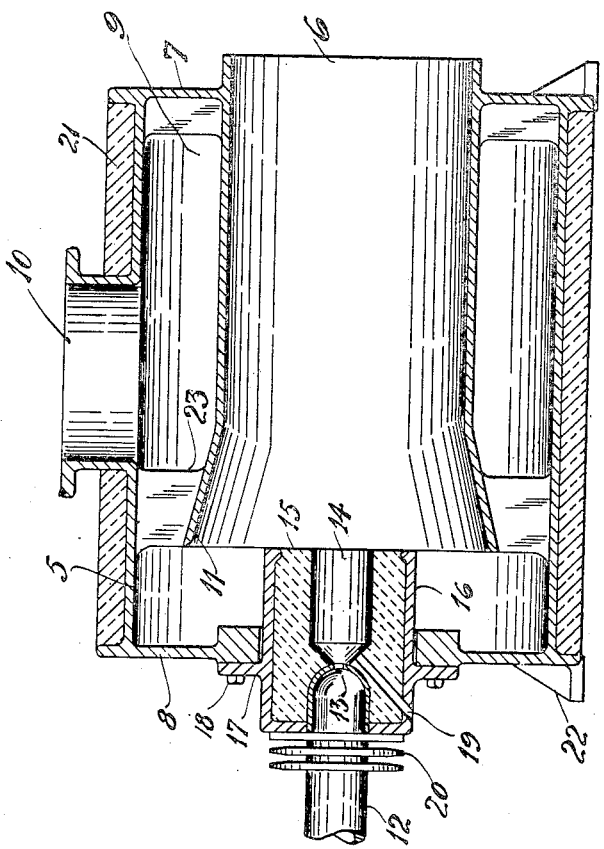
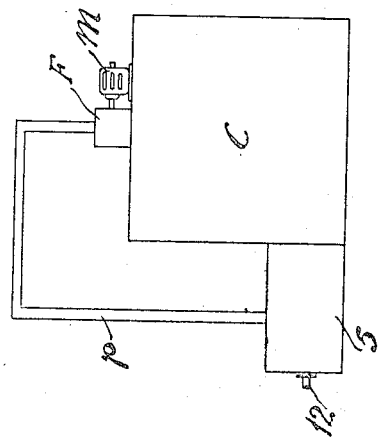

1,791,561

UNITED STATES PATENT OFFICE

HENRY M. HEYN, OF TOLEDO, OHIO, AND FRANK H. TREMBLY, JR., OF PHILADELPHIA, PENNSYLVANIA, ASSIGNORS TO THE SURFACE COMBUSTION CORPORATION, OF TOLEDO, OHIO, A CORPORATION OF NEW YORK

APPARATUS FOR HEATING AIR

Application filed May 3, 1929, Serial No. 360,222. Renewed April 2, 1930.

This invention relates to apparatus for heating a gaseous medium such as air and has for its object to provide a heater through which the gaseous medium may be passed in a manner to be heated by mixing with hot products of combustion from a gas burner. The invention has utility in connection with drying ovens and other heating apparatus where moderate temperatures are desired.

Referring to the drawing Fig. 1 is a schematic view showing the heater embodied with a device wherein materials to be heated may be contained, and Fig. 2 is an enlarged sectional view of the air heater itself.

Briefly described the heater comprises a casing wherein is embodied a conduit between the walls of which and the walls of the casing is an annular space wherein air introduced into the casing is preheated by absorbing heat from the surrounding walls but primarily from the walls of the conduit before entering the conduit for mixing with products of combustion generated by a burner positioned within the casing at the entrance to the conduit and of a type adapted to burn preformed explosive gaseous mixtures. The air to be heated is forced through the casing by a fan or blower and may be drawn directly from the atmosphere or from within a heating chamber as illustrated in Fig. 1 in order to reheat the gaseous medium which is circulated through said chamber.

In the drawing, 5 indicates a tubular heater casing within which is concentrically positioned a conduit 6 open at both ends one of which ends projects through an end wall 7 of the casing and the other of which terminates short of the other end wall 8 of the casing, the conduit and casing being of such relative diameters that an annular space 9 is formed between the walls thereof, the casing having an inlet 10 discharging into said space whereby air introduced thereinto as by a fan or blower F will circulate about the conduit before passing forwardly toward the mouth 11 of the conduit for passage therethrough.

Positioned in the front wall 8 of the heater casing in concentric relation with the conduit 6 is a burner for generating hot products of combustion which upon mixing with the air delivered into the conduit 6 serve to heat the air. This burner is of a type adapted to burn explosive gaseous mixtures the mixture being formed in any suitable manner and supplied to the burner through a conduit 12 which terminates in a burner nozzle having a restricted discharge orifice 13 which discharges into a combustion tunnel 14 formed in a body of refractory material 15 contained within a confining casing 16 having a radial flange 17 through which securing means 18 may be passed for detachably securing the burner to the wall 8 of the heater casing 5. The explosive mixture is lit in any suitable manner as by inserting a torch through a lighting port or passage 19 leading from the combustion chamber 14 to a point exteriorly of the wall 8 of the heater casing. The explosive mixture is discharged from the nozzle orifice 13 with a velocity greater than the rate of propagation of inflammation through the mixture but on entering the combustion tunnel its velocity is reduced to such an extent that it burns within said tunnel, the products of combustion tending to flow towards the outlet end of the conduit 6. Heat absorbed by the burner nozzle is dissipated by cooling fins 20 secured to the nozzle conduit exteriorly of the refractory confining casing 16.

The burner is not of such capacity with respect to the conduit 6 as will enable the combustion products issuing from the combustion tunnel 14 to entrain enough air from in front of the conduit 6 to prevent the conduit from becoming over heated by the highly heated gases issuing from the combustion chamber 14 of the burner. The air to be heated is therefore positively forced into the heater casing 5 and through the conduit 6 by a fan or blower F of any suitable type. The air may be drawn directly from the atmosphere or as shown in Fig. 1 may be drawn from an oven or chamber C adapted to contain materials to be dried or heated for one purpose or another in which event the air heater forms part of a closed cycle, the oven gases being continually reheated. In any event the gases entering the heater casing 5 will be relatively cool as compared with the products of combustion generated by the burner and since they are introduced into the annular space 9 about the conduit 6 will serve to cool the walls thereof as well as the walls of the heater casing before flowing forwardly towards the mouth of the conduit for passage therethrough. The current of air flowing through the conduit will of course draw the hot combustion gases from the burner along with it and be heated by such gases. It is quite immaterial whether the fan be directly connected to the inlet 10 of the heater casing or whether there be an intervening conduit P as illustrated in Fig. 1. The fan may of course be driven in any suitable manner as by an electric motor M.

The heater casing is preferably surrounded by a heat-insulating material 21 and supported on a suitable base 22 formed as part of the casing. The inner end of the conduit is supported in any suitable manner as by ribs 23 extending between the side walls of the casing and the conduit. The heater casing and conduit may be cast so as to from an integral structure. The burner is so constructed and supported as to permit ready removal from the heater casing as for repairs. The heater as a whole is simple in construction and otherwise well adapted for its intended purpose.

It will of course be understood that the oven or heating chamber C is not absolutely gas tight particularly around the doors thereof (not shown) through which the material is inserted and removed from the oven and consequently there will always be some leakage of gases from the oven. It will of course also be understood a special vent or relief valve (not shown) may be provided on the oven for preventing the building up of excessive pressure therewithin such as would prevent the heating apparatus from functioning.

What is claimed is:

1. In apparatus for heating a current of gaseous medium, the combination of a casing, a combustion tunnel projecting into the casing from one end wall thereof, a conduit within the casing of a length to extend from an opening in the other end wall of the casing to a point short of the first mentioned end thereof, said tunnel and conduit being in axial alinement, the casing and conduit being of such relative sizes that a free flow space is formed therebetween, said casing having an inlet which discharges into said space whereby the gaseous medium entering said casing through said inlet tends to cool the walls of the conduit before passing therethrough, and means for introducing explosive gaseous mixture into said tunnel.

2. In apparatus for heating a current of gaseous medium, the combination of a casing, a combustion tunnel projecting into the casing, a conduit within the casing of a length to extend from an opening in one end of the casing to a point adjacent the discharge end of said tunnel and separated from the side walls of the casing by a free flow space, said casing having an inlet which discharges into said space about the conduit whereby the gaseous medium entering the casing by way of said inlet may flow about the walls of the conduit before passing thereinto, and means for introducing explosive gaseous mixture into said tunnel.

3. In apparatus for heating and reheating a gaseous medium flowing in a closed circuit from a heating chamber adapted to contain materials to be heated, the combination of a casing forming part of said circuit and having an inlet and outlet for said medium, said outlet comprising a conduit opening out of the casing at one end thereof and terminating short of the other end to permit said medium to enter said conduit, said inlet to the casing being remote from the inlet end of the conduit whereby said medium may surround the conduit before entering into the same, and means for discharging premixed air and fuel into the inlet end of said conduit.

4. In apparatus for heating and reheating a gaseous medium flowing in a closed circuit, the combination of a casing forming part of said circuit and having an inlet and outlet for said medium, said outlet comprising a conduit opening out of the casing at one end thereof and terminating short of the other end to permit said medium to enter said conduit, said inlet to the casing being remote from the inlet end of the conduit whereby said medium may surround the conduit before entering the same, a fuel burner set to discharge into said conduit at the inlet end thereof, said fuel burner comprising a combustion chamber open at one end, and means for introducing into said chamber at a point remote from said end a premixed charge of fuel and air.

5. In apparatus for heating and reheating a gaseous medium flowing in a closed circuit, the combination of a casing forming part of said circuit and having an inlet and outlet for said medium, said outlet comprising a conduit opening out of the casing at one end and terminating short of the opposite end of the casing, said inlet being intermediate the ends of said conduit, a fuel burner set to discharge into said conduit in the direction of flow therethrough of said medium, said fuel burner comprising a combustion chamber open at one end, and means for introducing into said chamber at a point remote from its said open end a premixed charge of fuel and air.

6. In apparatus for heating and reheating a gaseous medium flowing in a closed circuit, the combination of a casing having an inlet in its side for said medium, a conduit within said casing through which said medium must pass to find exit from the casing, said conduit extending from one end wall of the casing and terminating short of the other end whereby said medium in order to enter said conduit must first flow in a direction opposite to its direction of flow through the conduit, and means within the casing for discharging highly heated products of combustion into the conduit in the direction of flow of said medium therethrough.

7. In apparatus for heating and reheating a gaseous medium flowing in a closed circuit from a heating chamber adapted to contain material to be heated, the combination of a casing having an inlet and outlet for said medium, said outlet comprising a conduit open at both ends, the discharge end of the conduit delivering through an end wall of the casing and the inlet end thereof being in spaced relation with respect to the other end wall of the casing, said conduit being in spaced relation with respect to the side walls of the casing, and means for burning explosive gaseous mixture adjacent the inlet end of said conduit.

8. In combination, a work-heating chamber, means for heating a gaseous medium, a fan for withdrawing spent heating gases from said chamber and delivering the same to said heater for reheating, said heating means delivering directly to said chamber and comprising a casing whereinto the spent gases are delivered, a conduit within the casing in spaced relation with respect to one end and the side walls of the casing and forming the outlet from the casing, and means for burning explosive gaseous mixture adjacent the inlet end of said conduit.

In witness whereof we have affixed our signatures.

HENRY M. HEYN.
FRANK H. TREMBLY, Jr.